Figure 1:
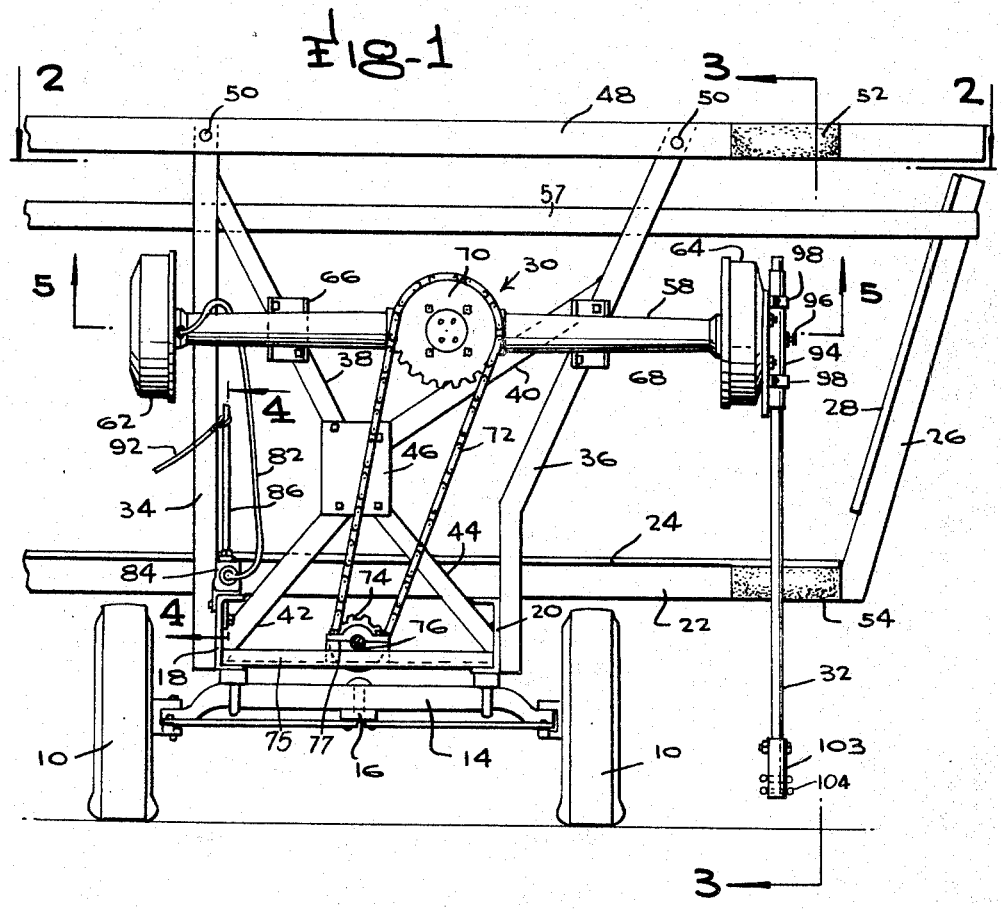

April 6, 1965 C. G. ANDREWS 3,176,830
BALE LOADER
Filed Sept. 6, 1963 3 Sheets-Sheet 1

INVENTOR.
CLARENCE G. ANDREWS
BY
McMorrow, Berman & Davidson
ATTORNEYS

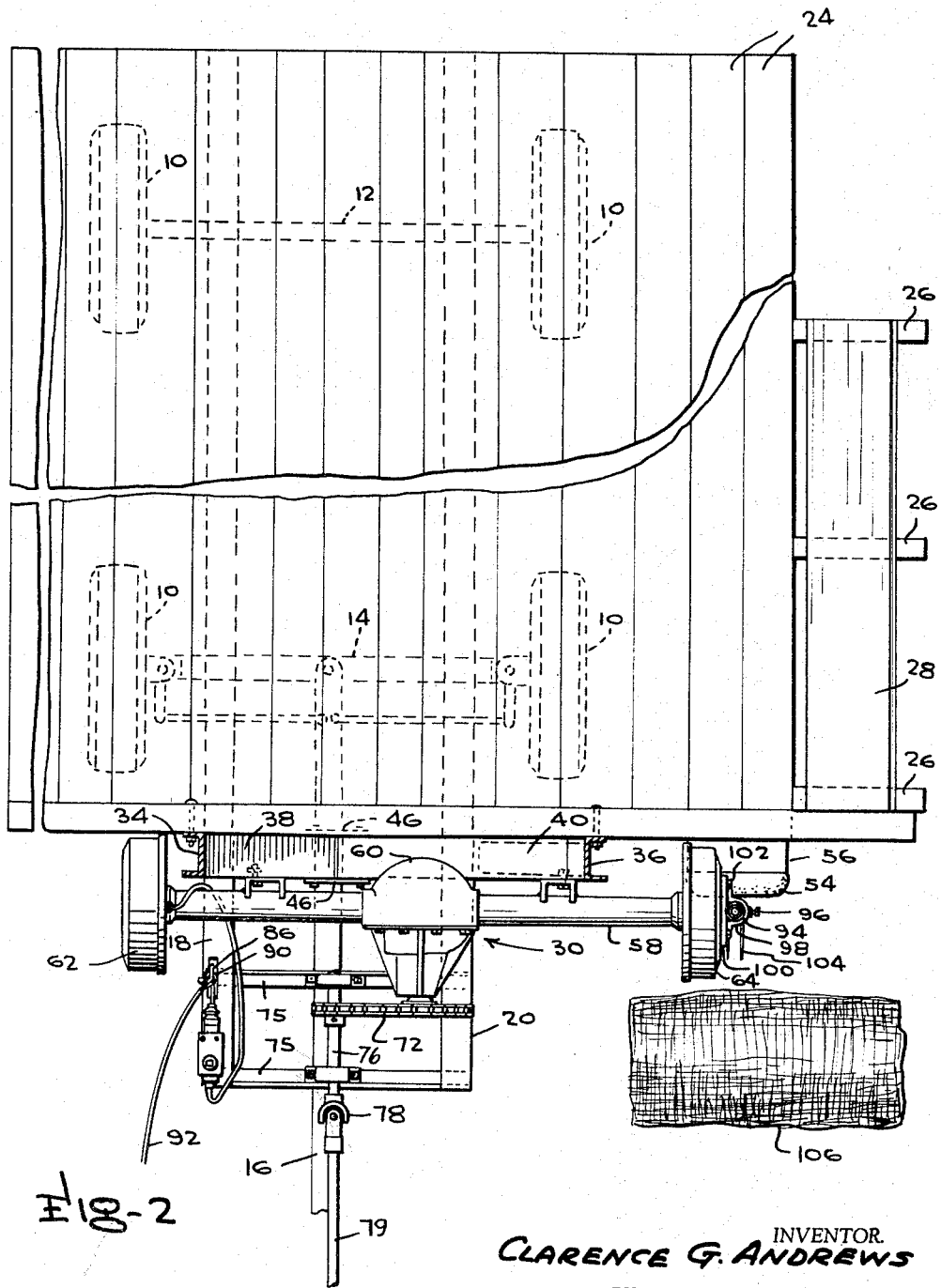

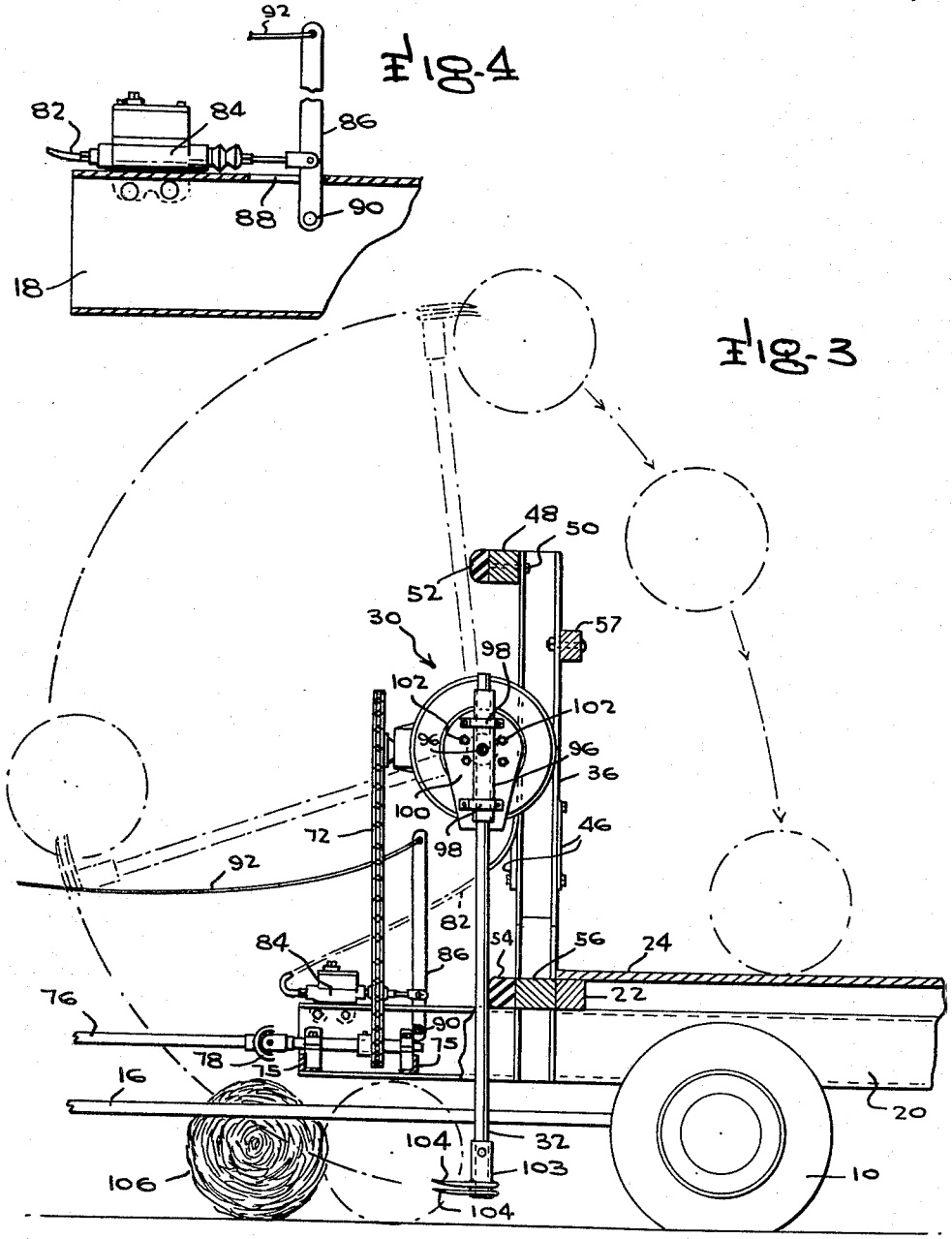

3,176,830
BALE LOADER
Clarence G. Andrews, 802 S. 17th St., Bismarck, N. Dak.
Filed Sept. 6, 1963, Ser. No. 307,248
1 Claim. (Cl. 198—128)

This invention relates to farm implements, and in particular to a device for picking up and loading onto a vehicle, or the like, of baled material, such as hay, or other bundles.

The primary object of the invention is to provide a more efficient device of the kind indicated, adapted to be mounted on a vehicle, which is designed to pick up and load material while the vehicle is in motion.

Yet another object is to reduce the cost of pick-up operations.

Figure 5:
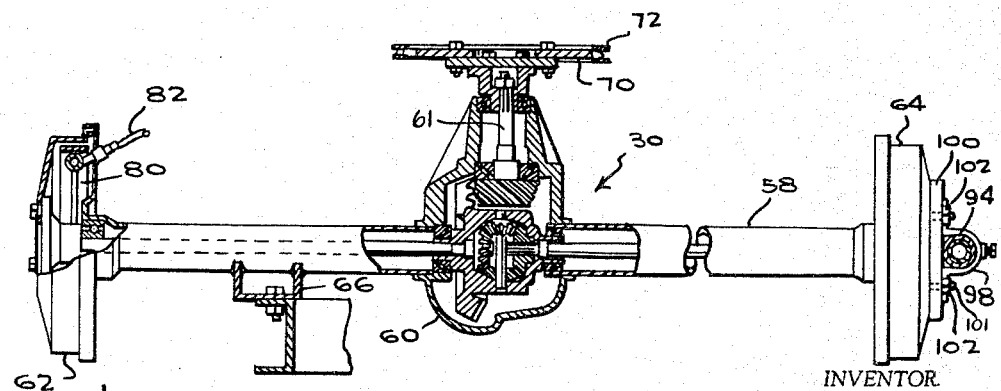

These and other objects, which will be apparent, are attained by the present invention, a preferred form of which is described in the following specification, as illustrated in the drawings, in which:

FIGURE 1 is a front elevational view of a trailer embodying a loading device according to the invention, FIGURE 2 is a contracted top plan view of the device, taken on the plane of the line 2—2 of FIGURE 1, parts being broken away and in section;

FIGURE 3 is a vertical, longitudinal sectional view, taken on the plane of the line 3—3 of FIGURE 1, FIGURE 4 is a fragmentary sectional view, showing details of the hydraulic control, taken on the line 4—4 of FIGURE 1, and FIGURE 5 is a partial, axial sectional view through the differential unit, taken on the line 5—5 of FIGURE 1.

Referring to the drawings by characters of reference there is shown a trailer vehicle having longitudinally spaced pairs of wheels 10, a rear axle 12, a front axle 14, a draw bar 16, channel chassis side members 18, 20, transverse cross members 22, and a floor 24 supported on the cross members. A series of longitudinally spaced, upwardly and outwardly angled posts 26 are fixed, at their lower ends, to the chassis frame side members 20, and have fixed to their inward sides, a deflector board 28, which angles down to the adjacent side of the floor 24.

A differential unit 30 is mounted on and above the front end of the chassis, and has, at one end thereof, a vertically swingable radial arm 32, which has means, on its outer end, adapted to be forwardly impaled in a bale of hay, with the arm in depressed position, the arm being adapted to be swung upwardly and forwardly, to lift the bale and deposit the same onto the trailer floor 24. The differential unit 30 is supported by laterally spaced uprights 34, 36, secured, at their lower ends, to the outer surfaces of the respective chassis side members 18 and 20. These uprights are braced by circumferentially spaced bars 38, 40, 42 and 44, having their inner ends fixed between a pair of flat rectangular plates 46. An upper cross beam 48, secured to uprights 34, 36, at their upper ends, as by bolts 50, carries near one end a bumper or pad 52, of resilient material, located in vertical alignment with the related end of the differential unit 30, for a purpose which is set forth hereinafter, and a second, similar bumper 54, for a related purpose, is located vertically below bumper 52, the latter being secured to a short block 56, which in turn is secured to the front chassis cross member 22. An intermediate cross beam 57, secured to uprights 34, 36 is secured at the related end thereof to the front post 26, for bracing the same.

The differential unit 30 is of a conventional automotive type, and comprises a differential housing 58, having an enlarged diameter middle portion 60, and has brake drums 62, 64, at its opposite ends. The differential housing 58 is welded in arcuate notches in the flanges of a pair of vertical channel strips 66, 68, bolted to the brace bar 38 and to the upright 36, respectively. The internal mechanism of the differential, as shown in FIGURE 5, provides a rearwardly extending drive shaft 61, on which is fixed a driven sprocket wheel 70, over which a chain 72 is trained, which is trained also around a drive sprocket wheel 74, fixed on a drive shaft 76, which is journaled through bearings 77, mounted on spaced cross bars 75, extending between and fixed to the chassis side members 18, 20. A tractor power shaft 79 is connected by a universal joint 78 to the forward end of the drive shaft 76.

A brake band 80 mounted in the drum 62 is actuated by hydraulic pressure from a line 82, leading from a cylinder 84, secured on chassis side member 18, which is operated by an upright lever 86, extending through a notch 88 in the upper flange of the chassis side member 18, and pivoted on a pin 90 on member 18, the lever being actuated by a lanyard 92.

The brake drum 64, at the other end of the differential unit, carries a radially disposed arm 32, long enough to reach to a level just above the ground, when in its depressed position. The upper end of the arm 32, which as shown is a tubular rod, is slidably engaged in a sleeve 94, in which it is held in adjusted position, by a set screw 96, the sleeve 94 being clamped against the outer side of the brake drum 64, by means of a pair of pipe straps 98, secured to a face plate 100, which in turn is secured by nuts 102 on the bolts 101 which normally secure a vehicle wheel to the drum. It will be noted that the arm 32 swings in a vertical plane which is at the centers of the bumpers 52 and 54. The arm 32, at its lower end, has a sleeve 103 fixed thereon, having fixed thereto a pair of vertically spaced horizontal, forwardly extending sharp prongs or spikes 104, adapted to impale a bale of hay or other penetrable mass.

The above normal torque imposed on the brake drum 64, by the weight of the arm 32 and a load impaled thereon, tends to immobilize the drum 64, so that the drum 62 is caused to rotate faster than the drum 64. When rotation of the drum 62 is retarded, by the braking action engendered by a pull on lever 86, the differential mechanism transfers rotation to the other drum 64, so that the arm 32 is swung upwardly and rearwardly, from its depressed position, and carries a load, such as a bale of hay 106, with it. The arm 32 is adapted to pick up bales from the ground, in front of the trailer, with the trailer stationary or moving forwardly. The upward and rearward swinging of the arm 32 is arrested by contact with the upper bumper 52, as shown in phantom lines in FIGURE 3, so that the momentum of the bale causes the bale to move rearwardly, relative to the arm 32, and fall onto the floor 24 of the trailer. Thereafter, slackening of the lanyard 92 releases the lever 86, and releases the braking of the related drum, so that the weight of the arm 32 causes it to subside to its depressed position, shown in FIGURE 3. The fall of the arm 32 is cushioned, at the bottom of its swing, by contact with the lower bumper 54.

Although impalement of the bale by the prongs 104 for pick up of the bale has been described as accomplished by swing of the arm 32, this impalement can be done by moving the trailer forwardly, aided by a short period of drag of the bale on the ground.

While a certain preferred embodiment of the invention has been shown and described, various modifications will be apparent, in the light of this disclosure, and the invention should not, therefore, be deemed as limited, except

I claim:

A bale loader comprising a support having a portion spaced above the ground, a horizontal transverse rotary member journaled on said support portion, a radial arm fixed to said rotary member, said arm being long enough that in a substantially perpendicular depressed pick-up position thereof its outer end is close to and spaced above the ground, lateral impaling means fixed on the arm at its outer end for impaling a bale, means for rotating said rotary member for swinging said arm upwardly from its depressed position, and bumper means on the support above said rotary member with which the arm is adapted to engage as it is swung upwardly, for arresting further swing of the arm and permitting the momentum of a bale impaled on said impaling means serving to throw the bale off the impaling means, said rotary member comprising a differential unit having rotary brake drums at its ends, the inner end of the arm being fixed diametrically on one of the brake drums, the differential having braking means for the other brake drum, means on the support for applying and releasing said braking means, said differential having a longitudinal drive shaft adapted to be operatively connected to a power shaft, said braking means being adapted to be applied for arresting rotation of said other drum and producing rotation of said one drum for swinging the arm upwardly from its depressed position, said braking means being thereafter adapted to release the braking means to permit the arm to fall gravitationally from an elevated position to its depressed position.

References Cited by the Examiner
UNITED STATES PATENTS

| | | | |
|---|---|---|---|
| 2,080,958 | 5/37 | Beasely et al. | |
| 2,675,750 | 4/54 | Boyer | 275—8 X |
| 2,757,807 | 8/56 | Ringness | 214—80 |
| 2,792,136 | 5/57 | Abbott | 214—78 |

HUGO O. SCHULZ, *Primary Examiner.*

MORRIS TEMIN, *Examiner.*